United States Patent
Lacerda et al.

(10) Patent No.: US 10,671,640 B2
(45) Date of Patent: Jun. 2, 2020

(54) ADAPTIVE CROSS-DEVICE EVENT DATA SYNCHRONIZATION

(71) Applicant: Apple Inc., Cupertino, CA (US)

(72) Inventors: Joao Pedro Lacerda, Santa Cruz, CA (US); Brian E. Korver, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 307 days.

(21) Appl. No.: 15/721,694

(22) Filed: Sep. 29, 2017

(65) Prior Publication Data
US 2018/0349460 A1    Dec. 6, 2018

Related U.S. Application Data

(60) Provisional application No. 62/514,752, filed on Jun. 2, 2017.

(51) Int. Cl.
*G06F 16/27*    (2019.01)
*H04L 29/08*    (2006.01)

(52) U.S. Cl.
CPC ........ *G06F 16/273* (2019.01); *H04L 67/1091* (2013.01); *H04L 67/1095* (2013.01); *H04L 67/22* (2013.01); *H04L 67/306* (2013.01); *G06F 16/275* (2019.01)

(58) Field of Classification Search
CPC ........ G06F 21/10; G06F 16/174; G06F 16/27; G06F 16/2308; G06F 9/526; G06F 9/45512; G06F 16/273; H04W 8/18; H04W 4/21; H04M 1/72527; H04L 29/12009; H04L 65/4092
See application file for complete search history.

(56) References Cited

U.S. PATENT DOCUMENTS

| | | | |
|---|---|---|---|
| 5,873,097 A * | 2/1999 | Harris | G06F 16/2308 |
| 9,398,090 B2 | 7/2016 | Houston | |
| 2002/0056011 A1 | 5/2002 | Nardone et al. | |
| 2002/0091703 A1* | 7/2002 | Bayles | G06Q 40/04 |
| 2002/0161769 A1 | 10/2002 | Sutinen et al. | |
| 2005/0273489 A1* | 12/2005 | Pecht | G06F 21/10 |
| | | | 709/203 |
| 2005/0289264 A1 | 12/2005 | Illowsky et al. | |

(Continued)

*Primary Examiner* — Etienne P Leroux
(74) *Attorney, Agent, or Firm* — Morgan, Lewis & Bockius LLP

(57) ABSTRACT

A device implementing adaptive, cross-device event data synchronization includes at least one processor to maintain a database on the device, the database storing event data items derived from user data items corresponding to user activity on the device or a second device. The at least one processor periodically transmits, to a server, first insertion records corresponding to new event data items generated at the device, the transmission periodicity based on a frequency at which the new event data items are generated. The at least one processor, upon detecting deletion of one user data item, deletes, from the database, one corresponding event data item, and immediately transmits, to the server for propagation to the second device, a first deletion record for deletion of one corresponding event data item at the second device, the first deletion record being transmitted along with any of the first insertion records awaiting transmission.

20 Claims, 7 Drawing Sheets

(56) References Cited

U.S. PATENT DOCUMENTS

| | | | |
|---|---|---|---|
| 2006/0019607 A1* | 1/2006 | Kim | H04M 1/72527 455/67.14 |
| 2008/0081609 A1* | 4/2008 | Burgan | H04W 8/18 455/425 |
| 2009/0271435 A1* | 10/2009 | Yako | G06F 9/526 |
| 2010/0057886 A1* | 3/2010 | Dodge | H04L 65/4092 709/219 |
| 2012/0089572 A1* | 4/2012 | Raichstein | G06F 16/174 707/645 |
| 2013/0091107 A1* | 4/2013 | San Andres | G06F 9/45512 707/695 |
| 2013/0304862 A1 | 11/2013 | Johansen et al. | |
| 2015/0178968 A1* | 6/2015 | Salmi | H04W 4/21 345/634 |
| 2015/0186486 A1* | 7/2015 | Rank | G06F 16/27 707/610 |

* cited by examiner

ADAPTIVE CROSS-DEVICE EVENT DATA SYNCHRONIZATION

CROSS-REFERENCE TO RELATED APPLICATIONS

The present application claims the benefit of U.S. Provisional Patent Application Ser. No. 62/514,752, entitled "CROSS-DEVICE EVENT DATA SYNCHRONIZATION," filed Jun. 2, 2017, which is hereby incorporated herein by reference in its entirety and made part of the present U.S. Utility Patent Application for all purposes.

TECHNICAL FIELD

The present description relates generally to data synchronization, including adaptive synchronization of event data across multiple devices.

BACKGROUND

Devices such as laptops, mobile phones, computers, mobile media devices and watches can include applications for accessing and interacting with content. A user can switch between the devices and the applications to access and interact with the content.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
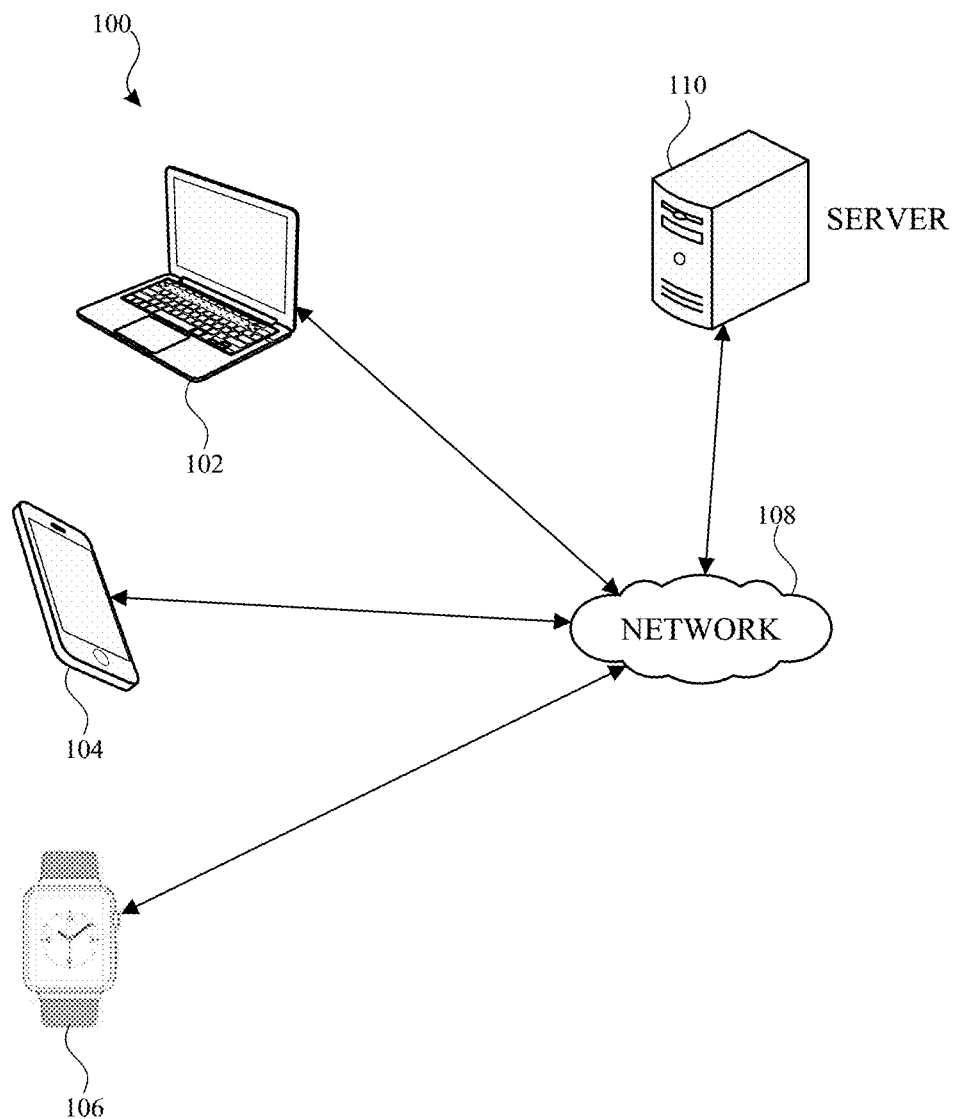
FIG. 1 illustrates an example network environment for adaptive, cross-device event data synchronization in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A user may utilize multiple electronic devices on a daily basis, such as a tablet, a phone, a smartwatch, a home computer, a work computer, and the like. A user profile may be generated and stored at each of the individual electronic devices based on the user's activity on each of the individual electronic devices. The user profile stored on an electronic device may be, and/or may be derived from, an event database that stores event data items that correspond to the user's activity on the electronic device. The user profile may be used by each individual electronic device to personalize the user's subsequent activity on the electronic device, such as by providing the user with relevant information, providing the user with keyword/query suggestions, and the like.

Since the user profile is generated based on user activity on the electronic device, if the user deletes all or part of their activity data on a given electronic device, the portions of the user profile derived from the deleted activity data are also deleted, such that remnants of the deleted activity data do not remain stored on the electronic device. Furthermore, the user profiles may only be stored locally on the individual electronic devices and may not be propagated and/or aggregated at a server, in order to preserve the user's privacy. However, by only storing the user profiles on the individual electronic devices on which the corresponding user activity occurred, the user does not receive the benefit of having their prior activity on one electronic device enhance their subsequent activity on another electronic device.

In the subject adaptive, cross-device event data synchronization system, a transport mechanism is provided for synchronizing user profiles across multiple electronic devices without aggregating the user profiles on a server. In this manner, the user's privacy is maintained while the user is provided the benefit of having their prior activity on any of their electronic devices used to enhance their subsequent activity across all of their electronic devices. Furthermore, if the user deletes all or part of their activity data on any of their electronic devices, the corresponding deletions from the user profile are immediately propagated to all of the user's electronic devices, such that remnants of the deleted activity data do not remain stored on any of the user's electronic devices.

FIG. 1 illustrates an example network environment 100 for adaptive, cross-device event data synchronization in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102, 104 and 106 (hereinafter 102-106), and a server 110. The network 108 may communicatively (directly or indirectly) couple, for example, any two or more of the electronic devices 102-106 and/or the server 110. In one or more implementations, the network 108 may be an interconnected network of devices that may include, or may be communicatively coupled to, the Internet. For explanatory purposes, the network environment 100 is illustrated in FIG. 1 as including electronic devices 102-106 and a server 110; however, the network environment 100 may include any number of electronic devices and any number of servers.

Each of electronic devices 102-106 may be, for example, a portable computing device such as a laptop computer, a smartphone, a peripheral device (e.g., a digital camera, headphones), a tablet device, a wearable device such as a watch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 102 is depicted as a laptop computer, the electronic device 104 is depicted as a smartphone, and the electronic device 106 is depicted as a watch. Each of electronic devices 102-106 may be, and/or may include all or part of, the electronic device discussed below with respect to FIG. 2, and/or the electronic system discussed below with respect to FIG. 7.

The server 110 may be, and/or may include all or part of the electronic system discussed below with respect to FIG. 7. The server 110 may include one or more servers (e.g., a cloud of servers and/or a cloud infrastructure) that facilitate adaptively synchronizing event data across multiple devices, e.g., across electronic devices 102-106. For example, a user of the electronic device 102 may access and interact with data related to a topic or entity using one or more applications running on the electronic device 102. This user interaction can be used to generate event data for synchronizing with the electronic devices 104 and 106.

In this regard, a topic may be a data item that exists in a structured data source, such as a data item that has an entry in an encyclopedia or an online encyclopedia, e.g., Wikipedia. For example, the topic can be the name of a sports team, a musician, a song, or the like.

On the other hand, an entity may relate to one or more concepts, but may be more generic and less restrictive than a topic for identifying a concept (e.g., a noun, place or thing). While there may be some overlap between entities and topics, entities are not mapped to any encyclopedia entries. For example, a sports team can correspond to both an entity and a topic, e.g., mapped to an entry in an online encyclopedia, whereas the name of a user's pet may correspond to an entity but not a topic, since the name of the user's pet is not mapped to an entry of an online encyclopedia.

For example, the user may search for the topic of a particular sports team, using a browser application running on the electronic device 102. The user may further bookmark (or save as a "favorite") a news article about that sports team on a news application running on the electronic device 102. The electronic device 102 can generate one or more event data items corresponding to the user interactions of: opening the browser application, searching for the particular sports team, opening the news applications, and/or bookmarking the news article about the sports team. An example event data item is discussed further below with respect to FIG. 4. The electronic device 102 can store the generated event data items in an event database, which is a local database that stores data describing the user's interactions with the electronic device 102. An example software architecture for locally monitoring user activity and generating corresponding event data items is discussed further below with respect to FIG. 3.

Further, the electronic device 102 can generate and transmit insertion records corresponding to the event data items to the server 110, for propagation to the electronic devices 104 and 106, such that the user's activity on the electronic device 102 is propagated to the electronic devices 104 and 106. When the server 110 receives the insertion records, the server 110 is configured to immediately push the insertion records to the electronic devices 104 and 106. In one or more implementations, the server 110 may also temporarily cache the insertion records for a period of time, such as one hour, one day, one month, or any period of time.

In another example, the user may later clear browser history related to the sports team, and remove the bookmark (or "favorite") article regarding the sports team. The electronic device 102 detects that the user has deleted data from which one or more event data items were generated, and the electronic device 102 responsively deletes the one or more event data items from the event database. Further, the electronic device 102 transmits a deletion record corresponding to the one or more event data items to the server 110, for propagation to the electronic devices 104 and 106.

When the server 110 receives the deletion record, the server 110 is configured to immediately push the deletion record to the electronic devices 104 and 106. The electronic devices 104 and 106 receive the deletion record and immediately delete the corresponding one or more data items from their respective event databases. In this manner, event data corresponding to the deletion of content on the electronic device 102 is adaptively synchronized across the electronic devices 104 and 106, via server 110. An example process for propagating event data item insertion/deletion records from the electronic device 102 to the other electronic devices 104 and 106 is discussed further below with respect to FIG. 5.

Similarly, the electronic device 102 may receive insertion and/or deletion records from one or more of the other electronic devices 104, 106 via the server 110. The electronic device 102 may insert the insertion records into its event database and the electronic device 102 may implement the deletion records by deleting the identified event data items identified therein from the event database. The electronic device 102 may also implement a record verification mechanism such that the electronic device 102 does not miss deletion records generated by any of the other electronic devices 104 and 106. If the electronic device 102 determines that one or more deletion records from one or more of the other electronic devices 104 and 106 were missed, the electronic device 102 may purge the event database and rebuild the event database based on the records that are temporarily cached at the server 110.

In this manner, the subject system provides for maintaining user privacy, by synchronizing event data items corresponding to user activity across the electronic devices 102-106, without aggregating user profile data on the server 110. Furthermore, the subject system implements a failsafe, such that when a user deletes any activity data on any one of the electronic devices 102-106, remnants of that data will not remain on any of the electronic devices 102-106, thus further improving the maintenance of privacy of the user's data across all of the user's devices. An example process of coordinating reception of event data item insertion/deletion records by the electronic device 102 from one or more of the other electronic devices 104 and 106 is discussed further below with respect to FIG. 6.

Figure 2:
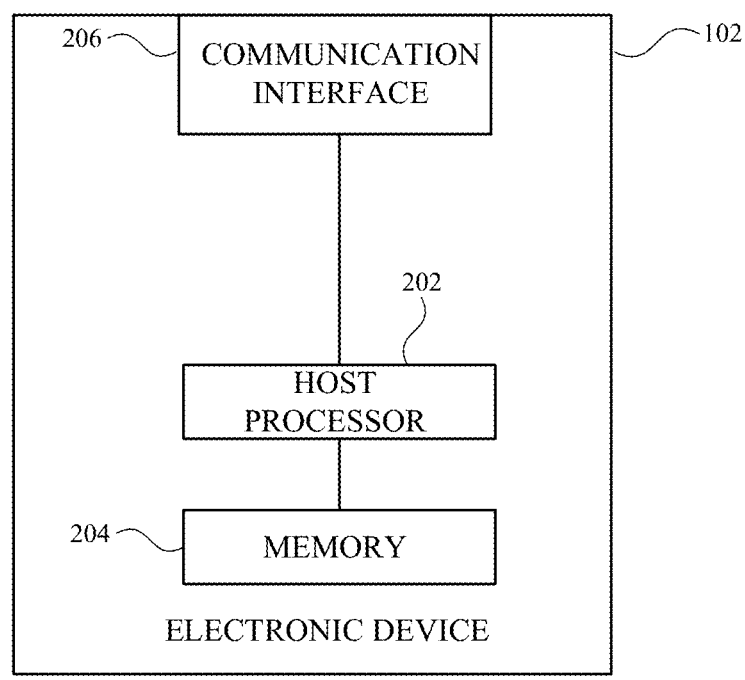
FIG. 2 illustrates an example electronic device that may be used in an adaptive, cross-device event data synchronization system in accordance with one or more implementations.

FIG. 2 illustrates an example electronic device 102 that may be used in an adaptive, cross-device event data synchronization system in accordance with one or more implementations. For example, electronic device 102 can correspond to any of the electronic devices 102-106 from FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a host processor 202, a memory 204, and a communication interface 206. The host processor 202 may include suitable logic, circuitry, and/or code that enable processing data and/or controlling operations of the electronic device 102. In this regard, the host processor 202 may be enabled to provide control signals to various other components of the electronic device 102. The host processor 202 may also control transfers of data between various portions of the electronic device 102. Additionally, the host processor 202 may enable implementation of an operating system or otherwise execute code to manage operations of the electronic device 102. In the subject system, the host processor 202 may implement the software architecture for adaptive, cross-device event synchronization that is discussed further below with respect to FIG. 3.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage. In one or more implementations, the memory 204 may store an event database that stores event data items generated from user activity on the electronic device 102 as well as event data items generated from user activity on the other electronic devices 104 and 106.

The communication interface 206 may include suitable logic, circuitry, and/or code that enables wired or wireless communication, such as between any of the electronic devices 102-106 and server 110 over the network 108. The communication interface 206 may include, for example, one or more of a Bluetooth communication interface, an NFC interface, a Zigbee communication interface, a WLAN communication interface, a USB communication interface, or generally any communication interface. The communication interface 206 may be used to receive event data item insertion/deletion records from the other electronic devices 104 and 106 via the server 110 and to transmit event data item insertion/deletion records to the other electronic devices 104 and 106 via the server 110.

In one or more implementations, one or more of the host processor 202, the memory 204, the communication interface 206, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
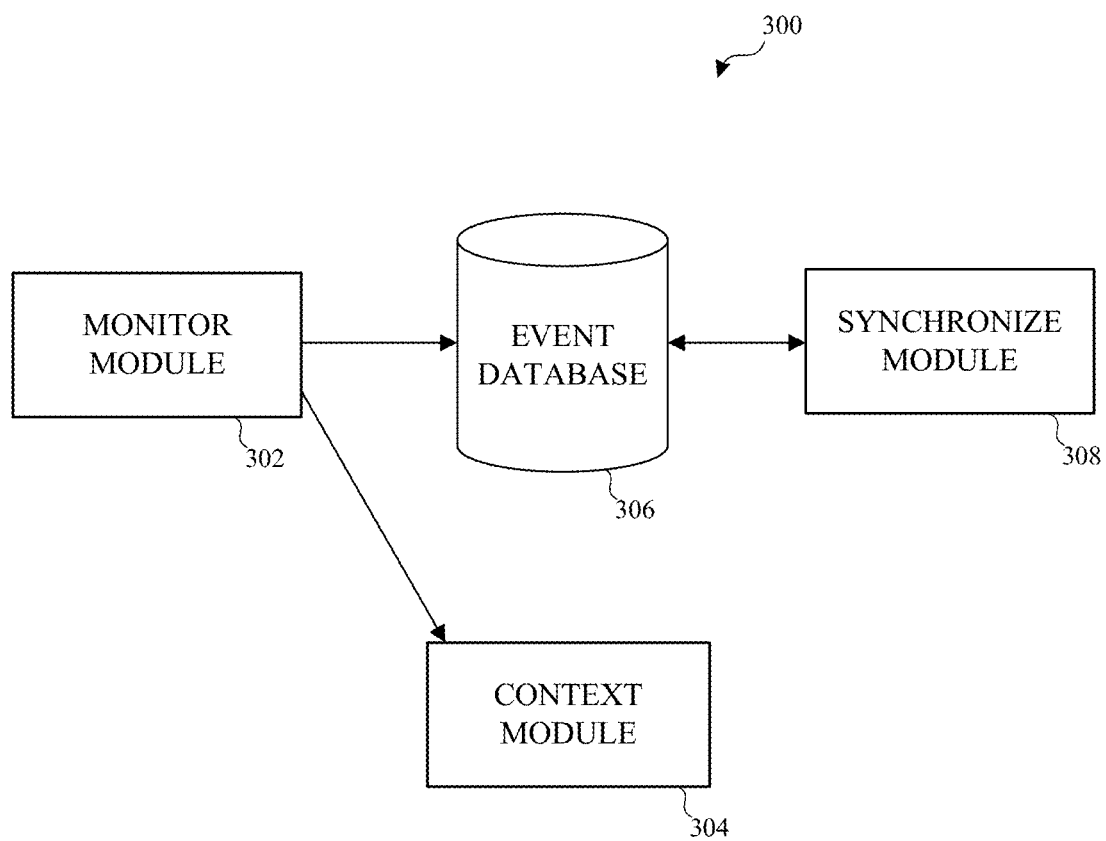
FIG. 3 illustrates an example architecture of an adaptive, cross-device event synchronization system that may be implemented by an electronic device in accordance with one or more implementations.

FIG. 3 illustrates an example architecture 300 of an adaptive, cross-device event synchronization system that may be implemented by an electronic device 102 in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

For example, the architecture 300 can be implemented by one or more software modules running on any of the electronic devices 102-106 from FIG. 1. For explanatory purposes, in FIG. 3, the architecture 300 is primarily described herein with reference to the electronic device 102. The architecture 300 is depicted as including a monitor module 302, a context module 304, an event database 306 and a synchronize module 308.

The monitor module 302 may locally monitor user activity on the electronic device 102, such as opening an application, closing an application, performing one or more actions within an application (e.g., that relate to one or more entities or topics), and the like. The monitor module 302 may facilitate in storing and maintaining event data items related to the monitored user activity in association with the event database 306. The monitor module 302 may further facilitate in providing data related to the monitored user activity to the context module 304, so that the context module 304 can reflect the current context of the electronic device 102.

By way of non-limiting examples, the applications that are monitored by the monitor module 302 may include a web browser, a news application, a social networking application, an email application, a messenger application, a music player application, a video player application, a photo application, or any other type of application for accessing or interacting with content (e.g., that corresponds to a topic and/or entity). In another example, types of user interaction within the applications may include opening content, viewing content, endorsing (e.g., "liking") content, opposing (e.g., "disliking") content, sharing content, commenting on content, reviewing content, or deleting content. In addition, users can interact with the applications for different time durations and/or at different times of the day.

The monitor module 302 may be configured to determine when monitored user activity is sufficient to generate an event data item, based on, for example, one or more factors or predefined rules for generating the event data items. For example, one or more of launching an application, clicking on a link within the application to access content relating to a topic and/or entity, or an interaction with such content may be predefined as sufficient for generating event data items. The monitor module 302 is further configured to generate event data items based on such predefined, sufficient user interaction, and to update the context module 304 and the event database 306 accordingly.

For example, the user may search the topic of a particular sports team using a browser application running on the electronic device, and may further bookmark a news article about that sports team on a news application running on the electronic device 102. The monitor module 302 may update the context module 304 based on this user activity (as is discussed further below), and the monitor module 302 may generate one or more event data items for updating the event database 306.

In another example, the user may later clear browser history related to the sports team topic, and remove the bookmark (or "favorite") article regarding the sports team. In order to determine that remnants of the deleted data do not remain on the electronic device 102, the monitor module 302 may treat these events as signals for deleting the associated event data item(s). The monitor module 302 may update the context module 304 based on this user activity, and may delete the corresponding event data items in the event database 306.

The context module 304 may store and provide data representing the current state of events on the electronic device 102. The context module 304 may receive data (e.g., in real-time) from the monitor module 302 and/or the operating system of the electronic device 102, in order to represent the current state of the device.

In one or more implementations, the context module 304 may indicate what application(s) are currently running on the electronic device 102 and the duration that each application has been running, the type of content being accessed on each application and the duration of accessing the content, and the user activity with respect to the accessed content. As noted above, this information can be provided, on a continuous basis, to the context module from the monitor module 302. In addition, the context module 304 may indicate (e.g., using the operating system) the current time, place and weather associated with the electronic device 102. For example, the above information accessible from the context module 304 can be used to determine the music the user the currently listening to, the application the user is currently using, the content the user is currently viewing or otherwise interacting with, the location of the user, and the current weather.

The event database 306 is a database that is locally stored on the electronic device 102. The event database 306 may store and update the event data items derived from user activity on the electronic device 102, as well as the event data items received via insertion records from one or more of the other electronic devices 104 and 106. Thus, in one or more implementations, the event data items correspond to user activity that spans multiple electronic devices, e.g., user activity on multiple of the electronic devices 102-106.

In this regard, the event database 306 for the electronic device 102 stores and updates event data items generated at the electronic device 102, as well as any event data items generated at the electronic devices 104 and 106 and received via insertion and/or deletion records. In addition, the event database 306 stored on the electronic device 104 stores and updates event data items generated at the electronic device 104, as well as any event data items generated at the electronic devices 102 and 106. Further, the event database 306 stored on the electronic device 106 stores and updates event data items generated at the electronic device 106, as well as any event data items generated at the electronic devices 102 and 104.

For example, if a user interacted with data related to a particular topic (e.g., a sports team) on the electronic device 102, the monitor module 302 updates the event database 306 by inserting a corresponding event data item into the event database 306. If the user later interacted with data related to the same topic the electronic devices 104 and/or 106, the event database 306 at the electronic device 102 may further be updated with corresponding additional event data items received via insertion records from the electronic devices 104 and/or 106. These insertion records may be received at electronic device 102 via the server 110, in response to the electronic devices 104 and/or 106 transmitting insertion records for the event data items to the server 110, for propagation to electronic device 102.

The synchronize module 308 coordinates the adaptive synchronizing of event data items across the electronic devices 102-106. Adaptive synchronization of event data items may be implemented by one or more different types of records, such as insertion records, deletion records, and the like.

With respect to insertion records, the electronic device 102 periodically transmits (e.g., via communication interface 206), to the server 110 for propagation to the electronic devices 104 and 106, insertion records corresponding to new event data items generated at the electronic device 102. In one or more implementations, the periodicity of the transmitting is based at least in part on a frequency at which new event data items are generated. For example, the synchronize module 308 may wait for a threshold number of new event data items (e.g., 10 events) to be generated at the electronic device 102, before generating and transmitting insertion records for the new data event items to server 110 for propagation to the electronic devices 104 and 106. In this manner, if the user activity on the electronic device 102, e.g., with respect to topics and/or entities, is high (e.g., several interactions per minute over an extended time period), then the transmission of corresponding insertion records with event data items will be more frequent. Conversely, if the user activity is low (e.g., very few interactions over the extended time period), then the transmission of corresponding insertion records will be less frequent. In one or more implementations, the user may only have one active electronic device. For example, the user may use the electronic device 102, but not have used the electronic devices 104 and 106 for at least a threshold amount of time. In this case, the frequency may be further adjusted for the electronic device 102 (e.g., the frequency of transmitting insertion records may be decreased).

With respect to deletion records, the electronic device 102 immediately transmits (e.g., via communication interface 206), to the server 110 for propagation to the electronic devices 104 and 106, a deletion record for causing deletion of the one of the event data items at the electronic devices 104 and 106. The deletion record is transmitted along with any of the insertion records awaiting transmission, and the transmitting is performed immediately irrespective of the periodicity of the periodic transmitting of the insertion records. In one or more implementations, the number of deletion records for immediate transmission by the electronic device 102 to the server 110 is subject to a maximum cap, for example, a threshold number of deletion records per given time period (e.g., day). In a case where the number of deletion records exceeds the maximum cap, the electronic device 102 may transmit subsequent deletion records to the server 110 on a periodic basis and/or once a threshold number of subsequent deletion records have been aggregated.

Thus, event data items may be adaptively synchronized across the electronic devices 102-106, without user profile data being aggregated on the server 110. With respect to deleting activity data, no remnants of the deleted user activity data will remain on the electronic devices 102-106, thus further improving the maintenance of privacy of the user's data.

In one or more implementations, the electronic device 102 may use one or more of the following adaptive parameters with respect to cross-device event data synchronization: a "SyncDisabled" parameter that represents a global toggle to enable or disable cross-device event synchronization, thereby respectively enabling or disabling the transmission of insertion and/or deletion records from the electronic device 102 to the server 110; an "AssetThresholdInBytes" parameter that represents a maximum size for a record (e.g., an insertion record) such that a record exceeding the maximum size is stored on the server 110 as a blob instead of as a record; a "FirstSyncPeriodInDays" parameter that represents how much data is synchronized on the first synchronization; a "MinSyncsPerDay" parameter that represents the minimum number of daily synchronizations; a "MaxSyncsPerDay" parameter that represents the maximum number of daily synchronizations; a "NumChangesTriggeringSync" parameter that represents how many changes are required to trigger a record synchronization; a "PolicyDownloadIntervalInDays" parameter that represents how often synchronization policies should be downloaded by the electronic device 102 from a server storing the policies; a "SingleDeviceSyncIntervalInDays" parameter that represents how often to synchronize if a user has only one active electronic device; a "StreamNamesWithAdditionsTriggeringSync" parameter that represents the streams that are tracked or monitored for insertions; a "StreamNamesWithDeletionsTriggeringSync" parameter that represents the streams that are tracked for deletions; and a "SyncTimeoutInSeconds" parameter that represents how long (e.g., a threshold duration of time) the electronic device 102 should wait on the server 110 to perform operations before timing out.

The above-listed parameters are examples of parameters that may be used for cross-device event data synchronization. Other parameter names and/or fields may be substituted for those described above, and additional and/or alternate parameters may be used with respect to synchronization.

In one or more implementations, the event database 306 is stored in the memory 204 and locally stores event data items derived from user data items corresponding to user activity on the electronic device 102. In one or more implementations, each of the monitor module 302, the context module 304 and the synchronize module 308 are implemented as software instructions, stored in the memory 204, which when executed by the host processor 202, cause the host processor 202 to perform particular function(s).

In one or more implementations, one or more of the monitor module 302, the context module 304 and the synchronize module 308 may be implemented in software (e.g., subroutines and code) and/or hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 4:
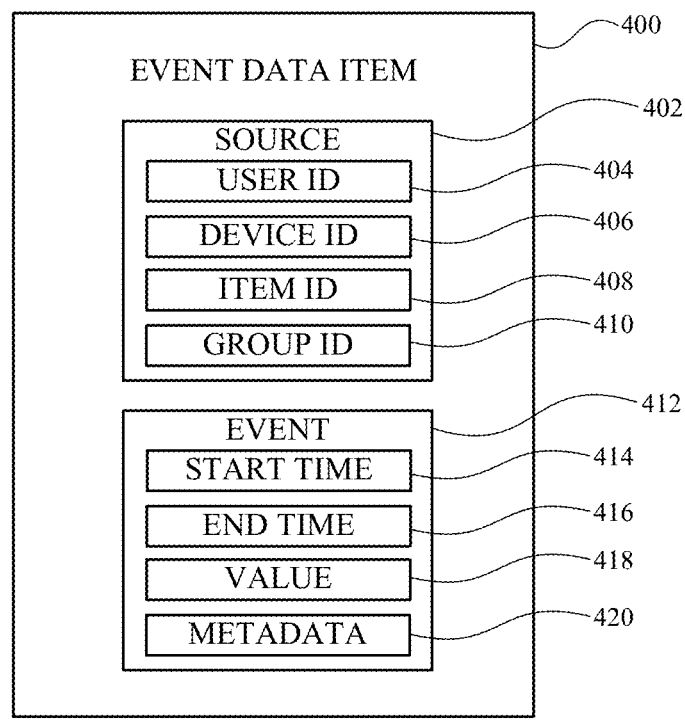
FIG. 4 illustrates an example event data item in accordance with one or more implementations.

FIG. 4 illustrates an example event data item 400 in a system for synchronizing event data in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The event data item 400 may be generated by one or more of the electronic devices 102-106. For example, the event data item 400 may be derived from user activity with respect to one more applications and/or the operating system of the electronic device 102, such as a user accessing and interacting with data related to a topic and/or entity, while using one or more applications and/or the operating system. The event data item includes source data 402 and event data 412.

The source data 402 is used to identify the source of the event data item 400. In one or more implementations, source data 402 includes a user identifier (ID) 404, a device ID 406, an item ID 408 and a group ID 410. Event data items 400 can belong to the same source, or can belong to different sources.

The user ID 404 uniquely identifies the user from among other users, while being the same for the user across different electronic devices (e.g., 102-106). For example, the user may be associated with a user account that is accessible and/or shared among the different electronic devices 102-106, with the user ID corresponding to the user account. For example, one or more of the electronic devices 102-106 may be registered, e.g., via the server 110, to the user account. By way of non-limiting example, a default user ID can be associated with an electronic device 102, or the user ID can be based on a username/password entered when logging onto an electronic device 102.

In one or more implementations, the device ID 406 within source data 402 uniquely identifies an electronic device (e.g., the electronic device 102) from among other devices (e.g., the electronic devices 104 and 106). Thus, each of the electronic devices 102-106 associated with the user (and/or the user account) can be differentiated from one another. In conjunction with the user ID 404, it is possible to distinguish between different users of the same electronic device. For example, if a primary user and a secondary user share the same electronic device 102, corresponding event data items 400 would store different user IDs 404, while sharing the same device ID 406.

In one or more implementations, item ID 408 within source data 402 uniquely identifies a particular data source for topic or event content which the user accesses or interacts with. For example, given a particular topic (e.g., a sports team), the item ID 408 may be a unique identifier of any of the following: a webpage if the user is viewing content of the topic via a web browser, a news article if the user is reading on the topic within a news application, a song related to the topic (e.g., theme song) if the user is listening to music within a music application, or a video related to the topic if the user is using a video player application.

In one or more implementations, the group ID 410 within source data 402 uniquely identifies a group of items to which an item ID 408 belongs. For example, if the item ID 408 identifies a specific webpage, the group ID 410 may identify a favorites folder or bookmarks folder which includes that specific webpage. In another example, if the item ID 408 identifies a specific article within a news application, the group ID 410 may identify a favorites folder or bookmarks folder which includes that specific article. In one or more implementations, the group ID 410 may not be used and may be set to "nil" for an event data item 400 (e.g., if a specific webpage is not within a favorites folder or a bookmarks folder).

The event data 412 of event data item 400 includes data corresponding to the user interaction, such as with an application, with topic and/or entity content, and the like. The event data 412 may include a start time 414, an end time 416, a value 418 and metadata 420.

In one or more implementations, the start time 414 within the event data 412 stores the date and time at which the event corresponding to the event data item 400 started. For example, user activity is related to accessing an application (such as to view content associated with an entity and/or topic), the start time 414 stores the date and time at which the user began such interaction (e.g., the time at which the user launched the application, and/or the time at which the user clicked on a link to direct to the user data related to the topic). The end time 416 within the event data 412 stores the date and time the user interaction associated with the event data item 400 ended. For example, if a user finished interacting with user data related to a topic on an application, the end time 416 stores the date and time at which the user ended such interaction (e.g., the time at which the user closed the application, or the time at which the user clicked on a different link to direct to the user data related to other content).

As noted above, the server 110 stores a temporary copy of insertion and deletion records before pushing the records to other electronic devices. The insertion records and deletion records are specific to a device, and include the date/time for the record. In one or more implementations, the date/time can be correspond to the start time 414 and end time 416 values of the event data item for insertion records, or can be a separately stored date/time for deletion records. Moreover, the insertion and deletion records each include unique per-device sequence numbers as is described further below with reference to FIG. 6.

The server 110 may be configured to implement a time-to-live (TTL) for each of the insertion and deletion records stored on the server 110. For example, the server 110 may implement a 30-day TTL for the records. Values other than 30 days can be used for the TTL, and the TTL value can be adjusted as needed (e.g., adjusted by the user or by a system administrator). Based on the date/time for each record stored on the server 110, records can be deleted once the TTL threshold is exceeded. Thus, the records will be temporarily stored on the server 110 no longer than the preset TTL threshold.

In one or more implementations, the value 418 within event data 412 identifies a topic or entity corresponding to the user activity. As noted above, an event data item 400 may correspond to a topic and/or an entity. As discussed above, a topic may be mapped to an entry of an online encyclopedia. In this instance, the value 418 may store a value of an index or identifier that maps to an entry of an online encyclopedia.

For example, the topic can be a sports team, musician, or song. In this manner, event data items can be created when a user interacts with content on a device.

The value 418 may also correspond to an entity. An entity may relate to one or more concepts, but may be more generic and less restrictive than a topic for identifying a concept (e.g., a noun, place or thing). While there may be some overlap between entities and topics, entities are not mapped to any encyclopedia entries. For example, a sports team can correspond to both an entity and a topic, e.g., mapped to an entry in an online encyclopedia, whereas the name of a user's pet may correspond to an entity but not a topic, since the name of the user's pet is not mapped to an entry of an online encyclopedia.

Alternatively, or in addition, the value 418 may indicate an application or an operating system function on the electronic device 102-106. For example, the value 418 may store an identifier that identifies the application or operating system function. Thus, in addition to creating and storing event data items based on a user interacting with a topic and/or entity (e.g., corresponding to content presented within an application), event data items can be created and stored when the user simply launches an application, uses an application, closes an application, or powers on/off the electronic device 102-106, without otherwise interacting with content within the application.

In one or more implementations, the topic and/or entities may correspond to interests of the user. As noted above, the synchronizing of event data items may be used to personalize/enhance subsequent user experiences across all of the user's electronic devices 102-106, irrespective of which of the electronic devices 102-106 the event data items were originally generated on. By analyzing the event data items, it is possible to determine interests (e.g., from topics and/or entities) of the user and to surface those interests within applications running on the devices. For example, a news article on a topic may be surfaced within a news application, or keyboard suggestions may be adapted to suggest interest (s) of the user. For example, the context module 304 can accessed to determine a current time, place, weather, or state associated with the user, content for topics and/or entities interesting to the user can be provided to the user based on the information provided by the context module 304.

In one or more implementations, the metadata 420 within event data 412 is data which further describes the event data item 400. For example the metadata provides additional description of the topic or entity of value 418. The metadata 420 can be structured or unstructured. Structured metadata corresponds to predefined metadata key pairings which are known, expected, or anticipated. Examples of structured data include an application launch reason, a device location, or a device motion state.

On the other hand, unstructured data can correspond to metadata key pairings which are unknown or otherwise unaccounted for. For example, a number of scenes (e.g., "scene 1" corresponding to morning, "scene 2" corresponding to afternoon, and "scene 3" corresponding to night) can be defined by the user based on time of day, and stored within the metadata 420 to further describe a topic or entity of the value 418, or to otherwise describe the event data item 400.

Figure 5:
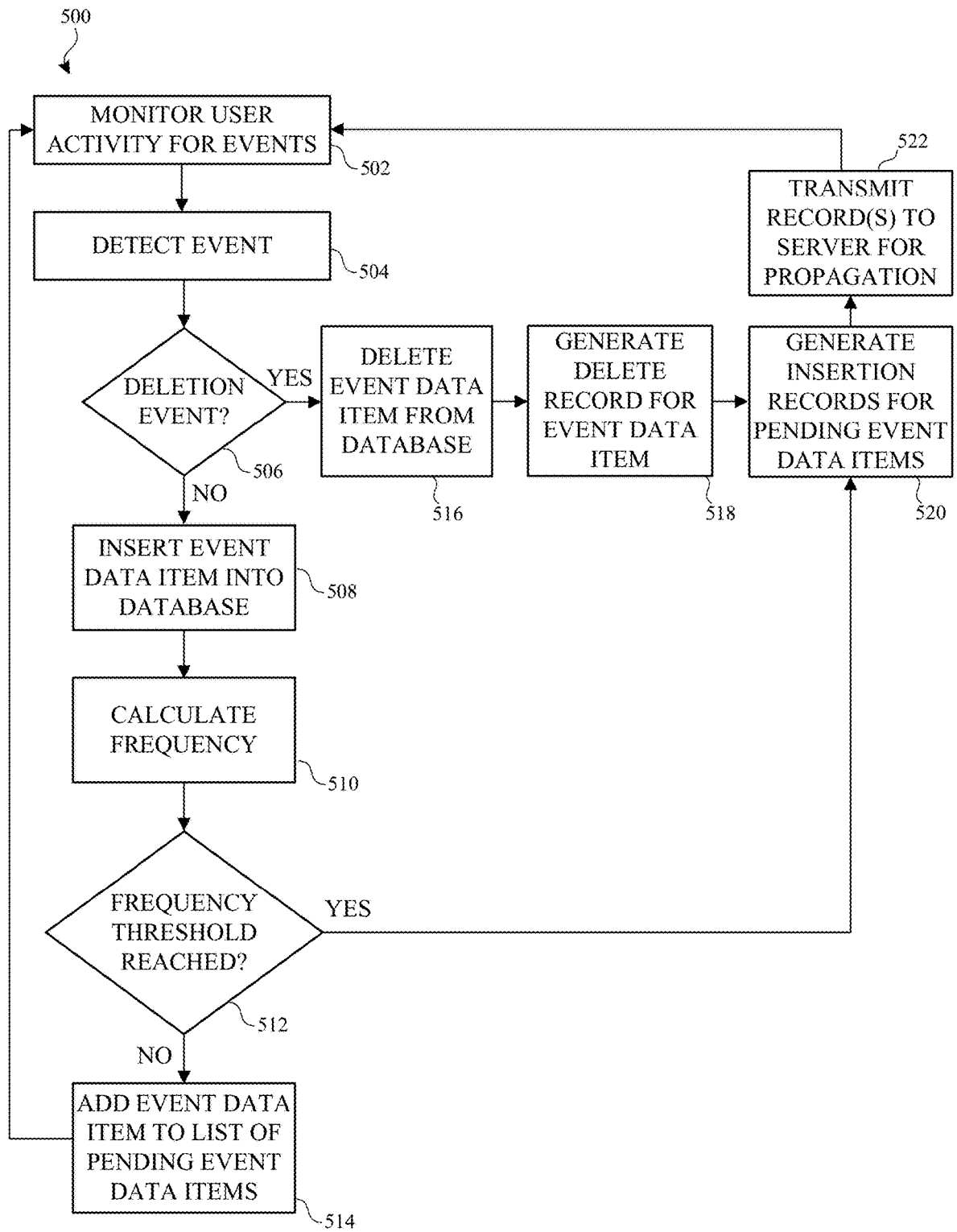
FIG. 5 illustrates a flow diagram of an example process for propagating event data item insertion/deletion records to other electronic devices in accordance with one or more implementations.

FIG. 5 illustrates a flow diagram of an example process 500 for propagating event data item insertion/deletion records to other electronic devices in accordance with one or more implementations. For explanatory purposes, the process 500 is primarily described herein with reference to the electronic device 102 of FIG. 1. However, the process 500 is not limited to the electronic device 102 of FIG. 1, and one or more blocks (or operations) of the process 500 may be performed by one or more other components of the electronic device 102 and/or by other suitable devices (e.g., electronic device 104 or 106). Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

The electronic device 102, via monitor module 302, continuously monitors user activity for events (502). As noted above, the monitor module 302 is configured to determine when user activity is sufficient to generate an event data item based on predefined rules for generating the event data items. For example, one or more of launching of an application, clicking on a link within the application to access content, the interaction with such content, or deleting information corresponding to such an interaction (e.g., deleting a bookmark) may be predefined as sufficient for generating event data items. On the other hand, user activity which is not suggestive of interaction with content may not be sufficient for generating an event data item.

Once a sufficient event is detected (504), the monitor module 302 handles the deletion of event data item(s) and the insertion of event data item(s) in different manners. For example, an insertion event may be detected when a user interacts with data related to a particular topic or event on the electronic device 102. If the sufficient event is an insertion event (the "No" branch of 506), the event database 306 is updated by generating an event data item 400 and inserting the generated event data item 400 into the event database 306 (508).

In one or more implementations, the generated event data item 400 may include the source data 402 and/or the event data 412, each having corresponding data fields. These fields may be used to for identifying the event data item(s) (e.g., for subsequent deletion, for surfacing interests, or for otherwise personalizing applications for a user). The user ID 404, device ID 406, and the value 418 can be used to identify all event data items associated with a specific user of the electronic device 102 for a given topic or entity (via the value 418). The generated event data item 400 is inserted into the event database 306 for the electronic device 102 (508).

In addition to inserting the event data item(s) into the event database 306, the inserted event data item 400 is periodically propagated to the other electronic devices of the user (e.g., electronic devices 104 and 106). In this regard, the synchronize module 308 coordinates the synchronization of the inserted event data item 400, e.g., in the form of an insertion record, across the multiple electronic devices 102-106 of the user.

As described above, the periodicity of the propagation is based at least in part on a frequency at which new event data items are generated. The synchronize module 308 calculates a current frequency based on the addition of the new event data item (510), and determines if the calculated frequency has reached a preset threshold frequency (512). In one or more implementations, the synchronize module 308 waits for a threshold number of new event data items (e.g., 10 events) to be generated at the electronic device 102, before generating and transmitting insertion records for the new data event items to server 110 for propagation to the electronic devices 104 and 106.

Thus, if the electronic device 102 determines that the threshold has not been reached (512), the synchronize module 308 adds the generated event data item to a list of pending event data items for subsequent transmission to the server 110 (514), and updates the frequency based on the new event data item 400. The process returns to monitoring user activity for events (502). If the electronic device 102 determines that the threshold has been reached (512), the synchronize module 308 generates a batch of insertion records for each of the event data items in the list of pending data items, clears the pending list of event data items (520), and resets the frequency.

Each of the insertion records may include data for the fields of the source data 402 and the fields of the event data 412 of the respective event data item. As noted above, these fields may be used for identifying the event data item(s) (e.g., for subsequent deletion, for surfacing interests, or for personalizing the user experience). Further, the user ID 404, device ID 406, and the value 418 may later be used to identify all event data items associated with a specific user of the electronic device 102 for a given topic or entity (via the value 418).

In addition, the electronic device 102 appends a unique sequence number to each of the insertion records. In one or more implementations, the unique sequence number may be generated by a sequence numbering system used solely by the electronic device 102 (e.g., not shared with the other electronic devices 104 and 106) exclusively for insertion records. The other electronic devices 104 and 106 may implement their own sequence numbering systems to uniquely identify the insertion records that they create, e.g., in conjunction with the device ID 406. The unique sequence numbers are described in more detail below with respect to FIG. 6.

After generating the batch of insertion records, the synchronize module 308 transmits (e.g., via communication interface 206) the batch of insertion records to the server 110 for propagation to the electronic devices 104 and 106, so that the corresponding event data items can inserted into the respective event databases 306 locally stored on each of the electronic devices 104 and 106 (522). Thus, event data items may be synchronized across the electronic devices 102-106, without user profile data being aggregated on the server 110, thereby improving the maintenance of privacy of the user's data.

With respect to deletion, a deletion event may be detected, for example, when the user clears a browser history related to a particular topic or event, and/or removes a bookmark (or "favorite") article regarding the particular topic or event. The monitor module 302 may identify such user activity as a signal to delete the associated event data item(s). If a deletion event is determined (a "Yes" at 506), the event database 306 of the electronic device 102 is updated by deleting a corresponding event data item(s) from the event database 306 (516).

The event data item(s) being deleted from the event database 306 can be identified based on the source data 402 and event data 412 fields of the data items. For example, the user ID 404 and device ID 406 of the source data 402, and the value 418 of the event data 412 can be used to identify all event data items associated with a specific user of the electronic device 102 for a given topic or entity (via the value 418). Thus, the value 418 can be matched to the topic or entity associated with the user data being deleted to identify the event data items for deletion. The identified event data items can be locally deleted from the event database 306 of the electronic device 102 (516).

In addition to deleting the event data item(s) from the event database 306, the deletion is immediately propagated to the other electronic devices of the user (e.g., electronic devices 104 and 106). In this regard, the synchronize module 308 coordinates the synchronization of a deletion record corresponding to the deleted event data items across the multiple electronic devices 104 and 106 of the user. In doing so, the synchronize module 308 generates a deletion record for the corresponding event data item(s) (518). For example, each of the electronic devices 104 and 106 store a respective event database 306, and the generated deletion record can indicate the user ID 404, device ID 406, and the value 418 on a per-device basis.

The electronic device 102 may append a unique sequence number to the deletion record. In one or more implementations, the unique sequence number may be generated by a sequence numbering system used solely by the electronic device 102 (e.g., not shared with the electronic devices 104 and 106) exclusively for deletion records. The other electronic devices 104 and 106 may implement their own sequence numbering systems to uniquely identify the deletion records that they create, e.g., in conjunction with the device ID 406. The unique sequence numbers are described in more detail below with respect to FIG. 6.

The synchronize module 308 immediately transmits (e.g., via communication interface 206), to the server 110 for propagation to the electronic devices 104 and 106, the generated deletion record for causing deletion of the one of the event data items at the event databases 306 of the electronic devices 104 and 106. In addition, the synchronize module 308 generates a batch of insertion records for each of the event data items in the list of pending data items awaiting transmission (if any), and clears the pending list of event data items (520). The deletion record is transmitted along with the generated batch of insertion records (if any) to the server 110 (522), and the process returns to monitoring user activity for events (502). Thus, when a user deletes activity data on any one of the electronic devices 102-106, no remnants of that data will remain on any of the electronic devices 102-106, further improving the maintenance of privacy of the user's data.

The transmitting is performed immediately irrespective of the periodicity of the periodic transmitting of the insertion records. With respect to the batch of insertion records transmitted with the deletion record, the corresponding event data items can be inserted into the respective event databases 306 on each of the electronic devices 104 and 106 as described above. Regarding the deletion record, once the deletion record is received at each of electronic devices 104 and 106, the user ID 404, device ID 406, and the value 418 can be used to identify all event data items associated with the of the electronic device 104 or 106 for a given topic or entity (via the value 418). The identified event data items can be locally deleted from the event database 306 of the electronic device 104 and 106 (516).

In one or more implementations, an event data item may be stored in the event database 306 in association with the insertion sequence number of the insertion record that included the event data item. In this instance, the insertion sequence number in association with the device ID 406 may be used in the deletion record to uniquely identify an event data item in the event database 306 for deletion.

In one or more implementations, a deletion event may not result in immediately propagating a corresponding deletion record to the other electronic devices of the user (e.g., electronic devices 104 and 106). Rather, similar to insertion events, the electronic device 102 may generate and transmit delete records in batches. For example, once the event data item(s) is deleted from the event database 306 locally stored on the electronic device 102 (516), the synchronize module 308 may calculate a current frequency for deletion events based on the current deletion event, and determine if the calculated frequency has reached a configurable preset threshold. The synchronize module 308 may wait for the threshold number of deletion events to occur if the threshold has not been reached. Once the threshold is reached, the electronic device 102 may then generate a batch of delete records for deleting the respective event data items (e.g., similar to 518), generate a batch of the pending insertion records (e.g., similar to 520), and transmit the batch of delete records and the batch of pending insertion records to the server 110, for propagation to the electronic devices 104 and 106 (e.g., similar to 522). The policy parameters for batching deletion events may differ from those for batching insertion events, including but not limited to different preset threshold frequency values.

Figure 6:
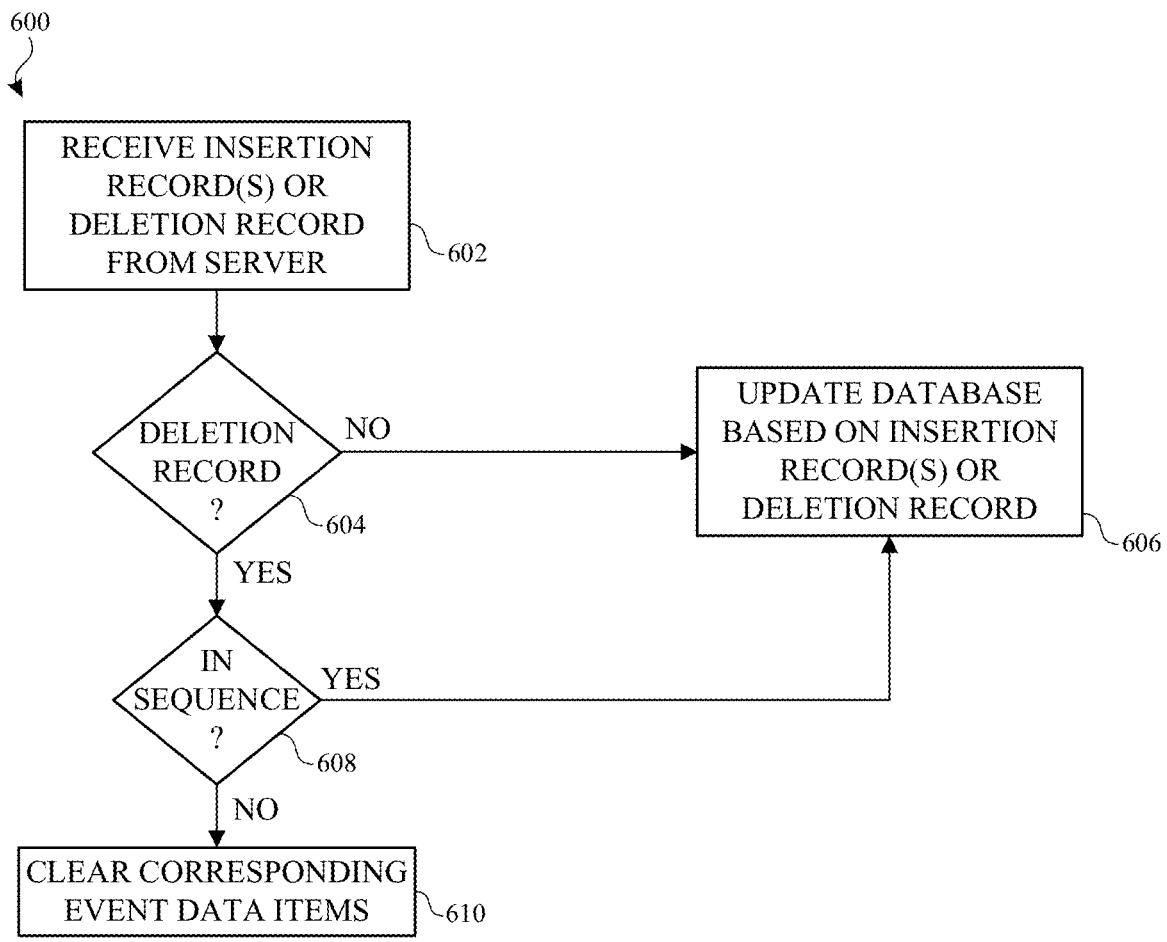
FIG. 6 illustrates a flow diagram of an example process for coordinating reception of event data item insertion/deletion records from one or more other electronic devices in accordance with one or more implementations.

FIG. 6 illustrates a flow diagram of an example process 600 for coordinating reception of event data item insertion/deletion records from one or more other electronic devices in accordance with one or more implementations. For explanatory purposes, the process 600 is primarily described herein with reference to the electronic device 104 of FIG. 1. However, the process 600 is not limited to the electronic device 104 of FIG. 1, and one or more blocks (or operations) of the process 600 may be performed by one or more other components of the electronic device 104 and/or by other suitable devices (e.g., electronic device 102 or 106). Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

The electronic device 104 receives insertion record(s) or a deletion record from the server 110 (602). For example, the insertion record(s) or deletion record may have been generated on the electronic device 102, and transmitted via the server 110 to the electronic device 104 (e.g., using communication interface 206). As noted above, each insertion record generated by the electronic device 102 includes a unique sequence number (e.g., an insertion sequence number) generated from a set of sequence numbers that is only used by the electronic device 102 and only for insertion records. Similarly, each deletion record generated by the electronic device 102 includes a unique sequence number (e.g., a deletion sequence number) generated from a set of sequence numbers that is only used by the electronic device 102 and only for deletion records.

By associating unique sets of sequence numbers with insertion records versus the deletion records, where the sets of sequence numbers are also unique across devices, it is possible for the synchronize module 308 of the electronic device 104 to detect whether incoming insertion records and/or deletion records received from server 110 are in proper sequence for a particular device (e.g., the electronic device 102).

In one or more implementations, the electronic device 104 stores the current insert and delete sequence numbers for each of the user's other electronic devices 102 and 106. For example, the electronic device 104 may store the following values in memory 204:

[Electronic device 102; Insertion; Sequence number a]
[Electronic device 102; Deletion; Sequence number b]
[Electronic device 106; Insertion; Sequence number x]
[Electronic device 106; Deletion; Sequence number y]

If the record received from the electronic device 102 is an insertion record(s) (a "No" at 604), the electronic device 104 would update its event database 306 based on that event data item provided with the insertion record(s) (606), and the electronic device 104 may increment the current insertion sequence number for the electronic device 102 that is stored in the memory 204. Thus, event data items may be synchronized across the electronic devices (e.g., 102 and 104), without user profile data being aggregated on the server 110, thereby improving the maintenance of privacy of the user's data.

In one or more implementations, if the received insertion record(s) is not in sequence when compared to the current insertion sequence number at the electronic device 104, this may signal that the event database 306 stored on the electronic device 104 is out of synchronization with respect to the event data items generated by the electronic device 102 (e.g., an insertion record was missed due to a prior transmission error). For example, if the received record at the electronic device 104 is the insertion record [Electronic device 102; Insertion; Sequence number a+2], then the sequence number is not in sequence, based on the current insertion sequence number for the electronic device 102 that is stored in the memory 204 [Electronic device 102; Insertion; Sequence number a] (e.g., since a+1, rather than a+2, is sequentially after a). In this case, the electronic device 104 may update its event database 306 to include the event data item that is missing (e.g., the event data item corresponding to sequence number a+1). For example, this missing event data item may be retrieved from the temporary cache of insertion and deletion records stored on the server 110, and/or the missing event data item may be requested from the electronic device 102.

If the received record is a deletion record (a "Yes" at 604), the electronic device 104 determines whether the deletion record is in sequence (608). For example, the received record at the electronic device 104 may be a deletion record [Electronic device 102; Delete; Sequence number b+1], for which the sequence number is in sequence, based on the current deletion sequence number for the electronic device 102 that is stored in the memory 204 [Electronic device 102; Delete; Sequence number b] (e.g., since b+1 is sequentially after b). Thus, the electronic device 104 would update its event database 306 to delete the appropriate event data item indicated by the deletion record from the event database 306 (606), and the electronic device 104 may increment the current deletion sequence number for the electronic device 102 that is stored in the memory 204. Thus, when a user deletes activity data on one electronic device (e.g., 102), no remnants of that data will remain on that device or on the user's other electronic device(s) (e.g., 104), further improving the maintenance of privacy of the user's data.

If the deletion record is not in sequence (608) when compared to the deletion sequence number at the electronic device 104, this may signal that the event database 306 stored on the electronic device 104 is out of synchronization with respect to the event data items deleted by electronic device 102 (e.g., a deletion record was missed due to a prior transmission error). In this case, the event data items corresponding to the electronic device 102 are cleared from the event database 306 stored on the electronic device 104 (610).

In one or more implementations, the electronic device 104 will request the records for the event data items corresponding to electronic device 102 that are being temporarily stored on the server 110. For example, the request can identify the electronic device 102, and request all records (e.g., insertion and deletion records with their corresponding sets of sequence numbers) as stored on server 110. The electronic device 104 may delete the entirety of its event database 306, and may request all of the records that are being locally stored on the server 110. As noted above, the server 110 temporarily caches insertion and deletion records for a given period of time.

In one of more implementations, the electronic device 104 can then rebuild its event database 306, with respect to the event data items for the electronic device 102, based on the received records. For example, the electronic device 104 iterates through the received records and applies each insertion and/or deletion in sequence. The electronic device 104 can further reset the current sequence numbers, corresponding to event data items for the electronic device 102, based on the last-applied insertion record and the last-applied deletion record. In one or more implementations, the electronic device 104 may not rebuild the event database 306 with respect to prior event data items corresponding to the electronic device 102, but may instead insert new event data items corresponding to the electronic device 102 into the event database 306 as they are received.

As described above, one aspect of the present technology is the gathering and use of data available from various sources to, for example, improve the delivery to users of content that may be of interest to them. The present disclosure contemplates that in some instances, this gathered data may include personal information data that identifies user activity on an electronic device with respect to a specific person. Such personal information data can include, for example, identification of user interests, a user ID, a device ID, demographic data, temporal-based data, location-based data, or other identifying information.

The present disclosure recognizes that the use of such personal information data, in the present technology, can be used to the benefit of users. For example, the personal information data can be used to deliver targeted content that is of greater interest to the user (e.g., providing the user with relevant information, providing the user with keyword/query suggestions, and the like). Accordingly, use of such personal information data enables discrete control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. As is described herein, the collected personal information is only stored on the user's own devices, with the exception of temporarily caching some data on a server for transport purposes.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information, or publically available information.

Figure 7:
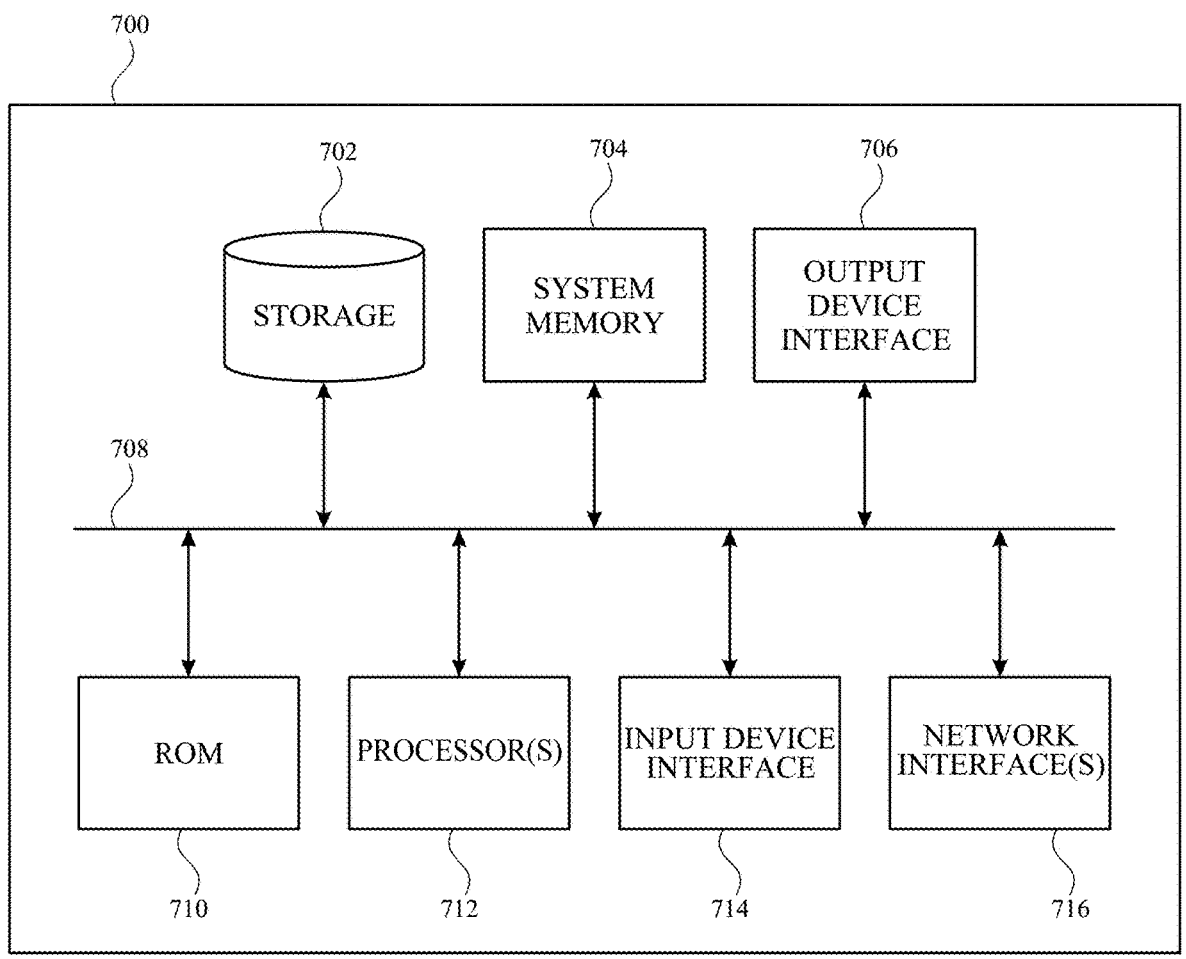
FIG. 7 illustrates an example electronic system with which aspects of the subject technology may be implemented in accordance with one or more implementations.

FIG. 7 illustrates an electronic system 700 with which one or more implementations of the subject technology may be implemented. The electronic system 700 can be, and/or can be a part of, one or more of the electronic devices 102-106, and/or one or the server 110 shown in FIG. 1. The electronic system 700 may include various types of computer readable media and interfaces for various other types of computer readable media. The electronic system 700 includes a bus 708, one or more processing unit(s) 712, a system memory 704 (and/or buffer), a ROM 710, a permanent storage device 702, an input device interface 714, an output device interface 706, and one or more network interfaces 716, or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the permanent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and instructions that are needed by the one or more processing unit(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store any of the instructions and data that one or more processing unit(s) 712 may need at runtime. In one or more implementations, the processes of the subject disclosure are stored in the system memory 704, the permanent storage device 702, and/or the ROM 710. From these various memory units, the one or more processing unit(s) 712 retrieves instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, the bus 708 also couples the electronic system 700 to one or more networks and/or to one or more network nodes, such as the electronic device 102 shown in FIG. 1, through the one or more network interface(s) 716. In this manner, the electronic system 700 can be a part of a network of computers (such as a LAN, a wide area network ("WAN"), or an Intranet, or a network of networks, such as the Internet. Any or all components of the electronic system 700 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 72, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device, comprising:
at least one processor configured to:
  maintain a database on the device, the database storing event data items derived from user data items that correspond to user activity on the device or that correspond to user activity on a second device of a user, the event data items being separate from the user data items;
  periodically transmit, based on a time interval to a server for propagation to the second device of the user, first insertion records corresponding to first new event data items generated at the device, the time interval of the transmitting being based at least in part on a frequency at which the first new event data items are generated;
  in response to detecting a deletion of one of the user data items:

delete, from the database, one of the event data items corresponding to the deleted one of the user data items; and transmit, to the server for propagation to the second device of the user, a first deletion record for causing deletion of the one of the event data items at the second device, the first deletion record being transmitted along with any of the first insertion records awaiting transmission, wherein the transmitting is performed immediately in response to detecting the deletion and the first deletion record is transmitted on an aperiodic basis with respect to the time interval.

2. The device of claim 1, wherein the at least one processor is further configured to:

receive, from the server, second insertion records corresponding to second new event data items generated at the second device; and add, via the second insertion records, the second new event data items generated at the second device to the database.

3. The device of claim 2, wherein the at least one processor is further configured to:

receive, from the server, a second deletion record corresponding to one of the second new event data items generated at the second device; and delete, via the second deletion record, the one of the second new event data items from the database.

4. The device of claim 3, wherein the first insertion records, the first deletion record, the second insertion records, and the second deletion record are discarded at the server, and still maintained on the device and the second device, once a time-to-live threshold has been exceeded for the respective records.

5. The device of claim 3, wherein the first insertion records each includes different first sequence numbers generated from a first set of sequence numbers, the first deletion record includes a second sequence number generated from a second set of sequence numbers, the second insertion records each includes different third sequence numbers generated from a third set of sequence numbers, and the second deletion record includes a fourth sequence number generated from a fourth set of sequence numbers.

6. The device of claim 5, wherein the at least one processor is further configured to:

detect, based on the fourth sequence number included in the second deletion record, that the second deletion record is out-of-sequence;

transmit, to the server, a request for a set of records comprising the first insertion records, the first deletion record, the second insertion records, and the second deletion record;

receive, from the server, the first insertion records, the first deletion record, the second insertion records, the second deletion record, and at least a third deletion record in response to the request; and delete and rebuild the database based on the received first insertion records, first deletion record, second insertion records, second deletion record, and the at least the third deletion record.

7. The device of claim 1, wherein each event data item comprises:

source data comprising data identifying the user, data identifying the device or the second device, and data identifying the respective user data item from which the event data item was derived; and event data comprising a start time and an end time for the user activity corresponding to the respective user data item.

8. The device of claim 7, wherein the event data further comprises at least one of: structured metadata identifying at least one of an application launch reason, a device location, or a device motion state, or unstructured metadata comprising user-customizable values.

9. The device of claim 1, wherein each event data item corresponds to at least one of a topic that is mapped to an online encyclopedia entry, or to an entity that represents a predefined noun, place or thing.

10. The device of claim 1, wherein the device and the second device are associated with a shared user account.

11. A method, comprising:

maintaining a database on a first device of a user, the database storing event data items derived from user data items that correspond to user activity on the first device of the user or that correspond to user activity on a second device of the user the event data items being separate from the user data items;

periodically transmitting, based on a time interval to a server for propagation to the second device of the user, first insertion records corresponding to first new event data items generated at the first device of the user, the time interval of the transmitting being based at least in part on a frequency at which the first new event data items are generated;

in response to detecting a deletion of one of the user data items:

deleting, from the database, one of the event data items corresponding to the deleted one of the user data items; and transmitting, to the server for propagation to the second device of the user, a first deletion record for causing deletion of the one of the event data items at the second device, wherein the transmitting is performed immediately in response to detecting the deletion and the first deletion record is transmitted on an aperiodic basis with respect to the time interval.

12. The method of claim 11, further comprising:

receiving, from the server, second insertion records corresponding to second new event data items generated at the second device; and adding, via the second insertion records, the second new event data items generated at the second device to the database.

13. The method of claim 12, further comprising:

receiving, from the server, a second deletion record corresponding to one of the second new event data items generated at the second device; and deleting, via the second deletion record, the one of the second new event data items from the database.

14. The method of claim 13, wherein the first insertion records, the first deletion record, the second insertion records, and the second deletion record are discarded at the server once a time-to-live threshold has been exceeded for the respective records.

15. The method of claim 13, wherein the first insertion records each includes different first sequence numbers generated from a first set of sequence numbers, the first deletion record includes a second sequence number generated from a second set of sequence numbers, the second insertion records each includes different third sequence numbers generated from a third set of sequence numbers, and the second deletion record includes a fourth sequence number generated from a fourth set of sequence numbers.

16. The method of claim 15, further comprising:
- detecting, based on the fourth sequence number included in the second deletion record, that the second deletion record is out-of-sequence;
- transmitting, to the server, a request for a set of records comprising the first insertion records, the first deletion record, the second insertion records, and the second deletion record;
- receiving, from the server, the first insertion records, the first deletion record, the second insertion records, the second deletion record, and at least a third deletion record in response to the request; and
- deleting and rebuilding the database based on the received first insertion records, first deletion record, second insertion records, second deletion record, and the at least the third deletion record.

17. A computer program product comprising code stored in a non-transitory computer-readable storage medium, the code comprising:
- code to maintain a database on the device, the database storing event data items derived from user data items that correspond to user activity on the device or that correspond to user activity on a second device of a user, the event data items being separate from the user data items;
- code to periodically transmit, based on a time interval to a server for propagation to the second device of the user, first insertion records corresponding to first new event data items generated at the device, the time interval of the transmitting being based at least in part on a frequency at which the first new event data items are generated;
- code to in response to detecting a deletion of one of the user data items:
  - delete, from the database, one of the event data items corresponding to the deleted one of the user data items, and
  - transmit, to the server for propagation to the second device of the user, a first deletion record for causing deletion of the one of the event data items at the second device, the first deletion record being transmitted along with any of the first insertion records awaiting transmission, wherein the transmitting is performed immediately in response to detecting the deletion and the first deletion record is transmitted on an aperiodic basis with respect to the time interval.

18. The computer program product of claim 17, wherein the code further comprises:
- code to receive, from the server, second insertion records corresponding to second new event data items generated at the second device; and
- code to add, via the second insertion records, the second new event data items generated at the second device to the database.

19. The computer program product of claim 18, wherein the code further comprises:
- code to receive, from the server, a second deletion record corresponding to one of the second new event data items generated at the second device; and
- code to delete, via the second deletion record, the one of the second new event data items from the database.

20. The computer program product of claim 19, wherein the first insertion records, the first deletion record, the second insertion records, and the second deletion record are discarded at the server, and still maintained on the device and the second device, once a time-to-live threshold has been exceeded for the respective records.

* * * * *